No. 890,667.
PATENTED JUNE 16, 1908.
J. LINGLEY.
WEATHER SCREEN FOR MOTOR VEHICLES.
APPLICATION FILED MAY 6, 1907.
5 SHEETS—SHEET 3.
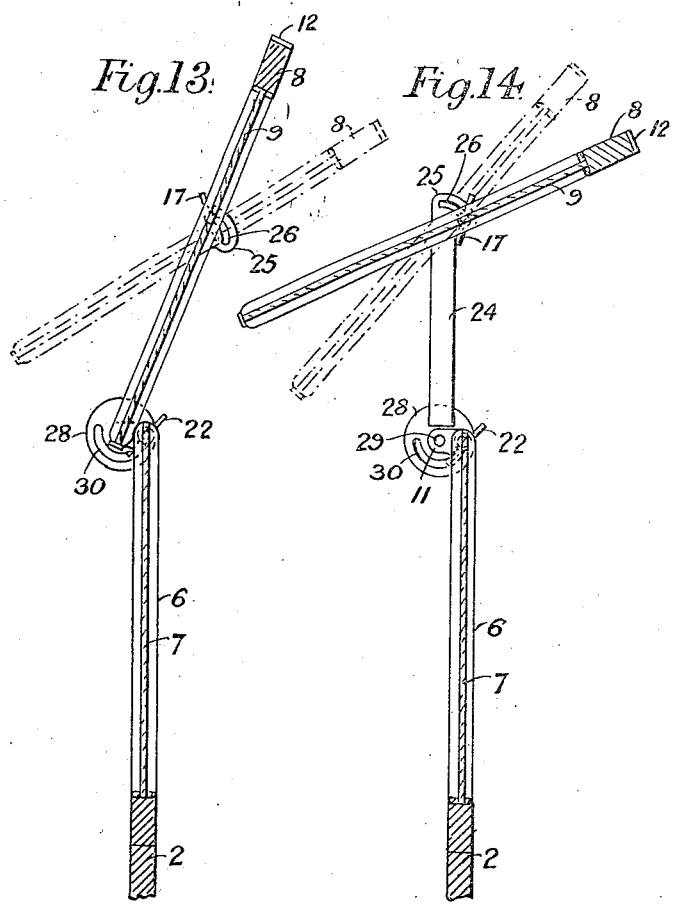
Witnesses:
C. H. White
J. A. Hudson.
Inventor:
Joseph Lingley
By Charles Melbourne White
Attorney

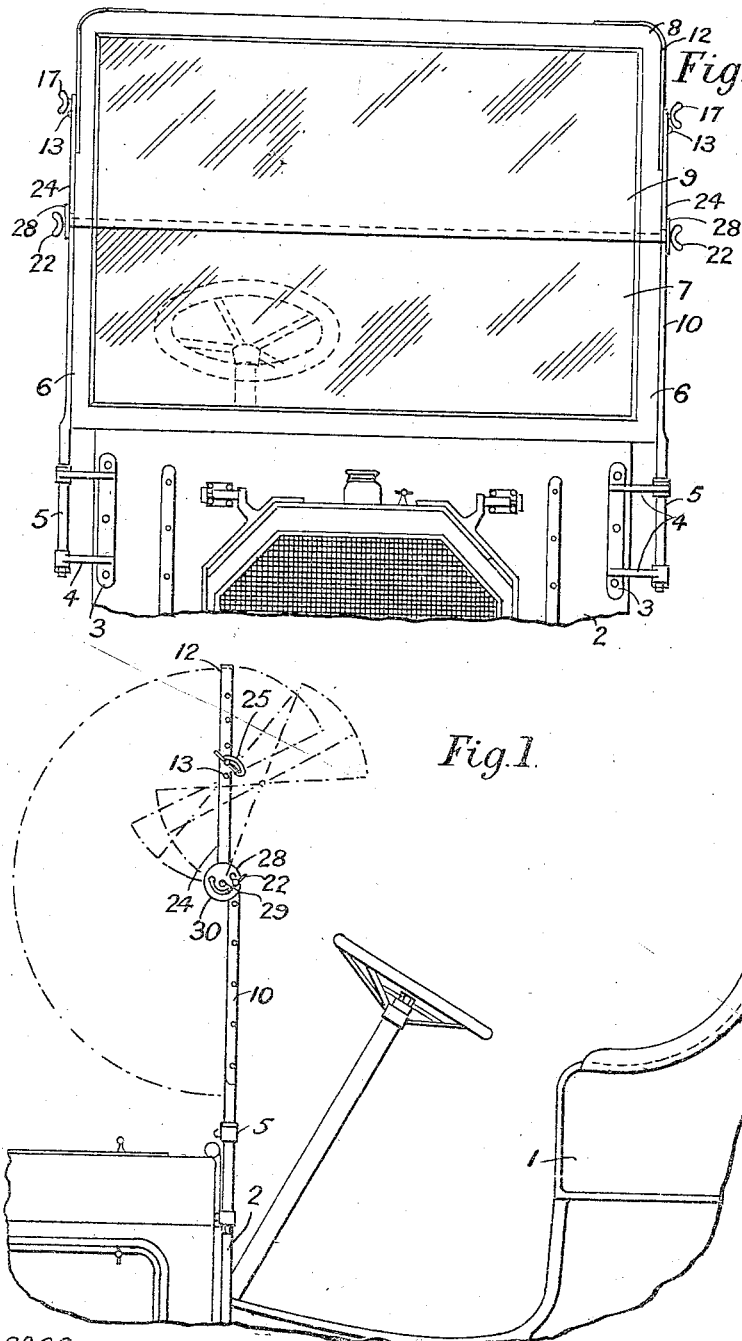

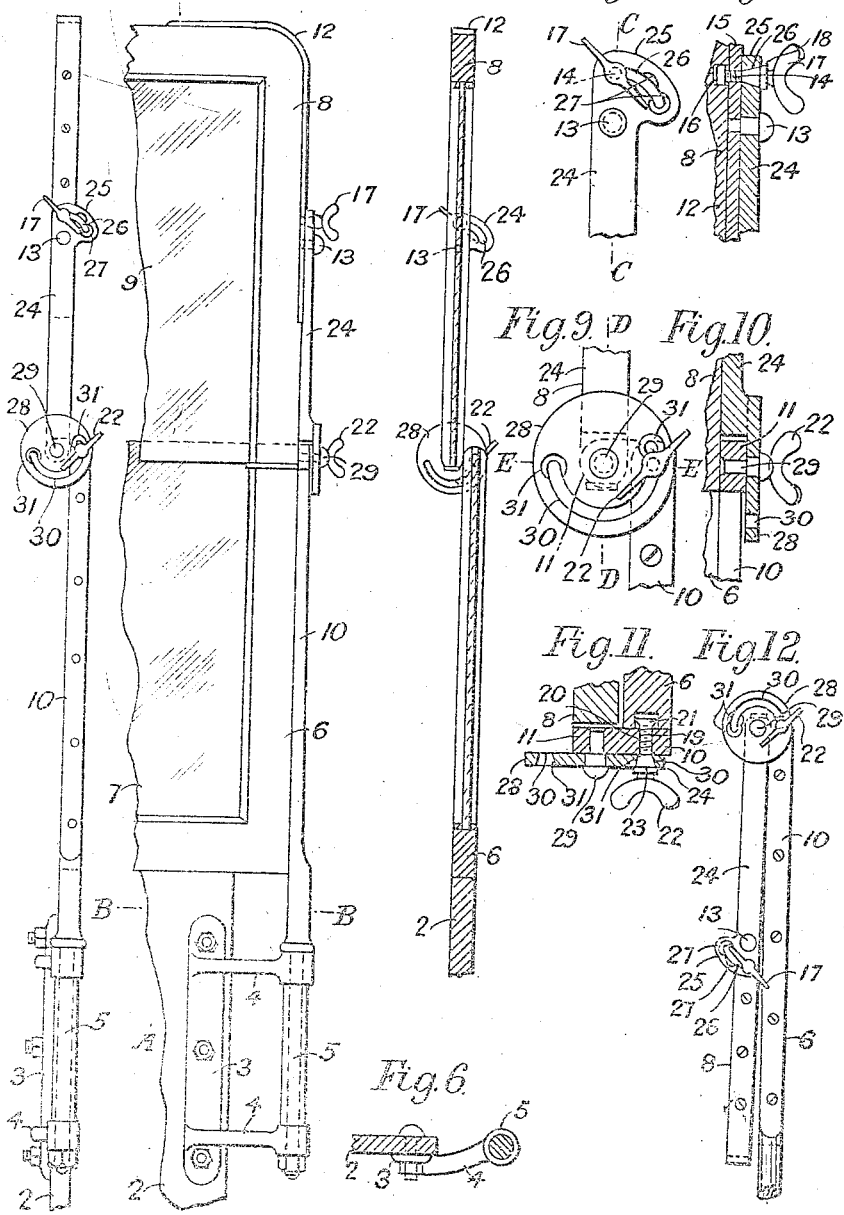

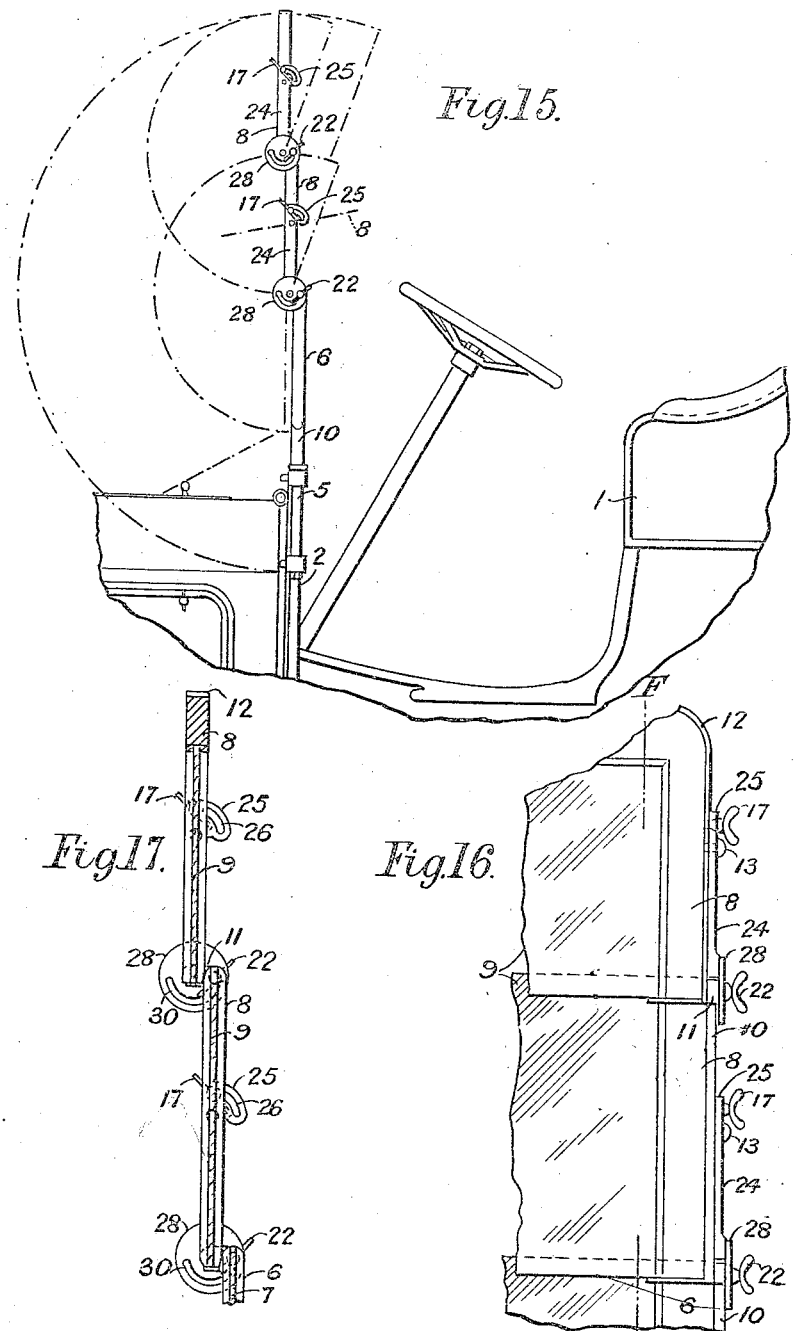

No. 890,667. PATENTED JUNE 16, 1908.
J. LINGLEY.
WEATHER SCREEN FOR MOTOR VEHICLES.
APPLICATION FILED MAY 6, 1907.
5 SHEETS—SHEET 5.
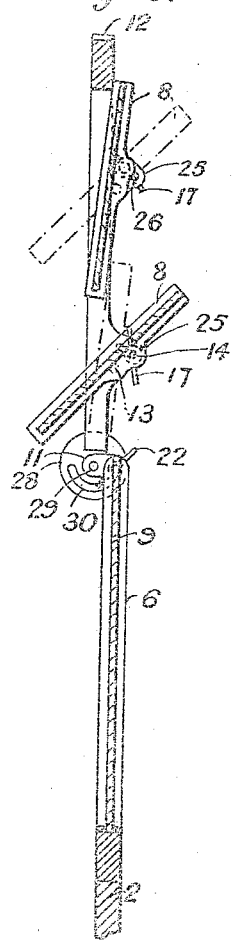
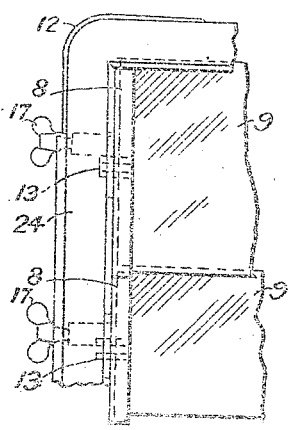
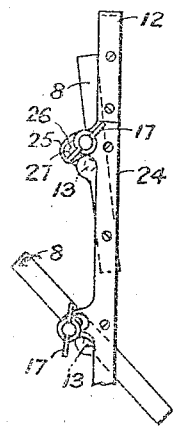
Witnesses.
C. H. ———
J. A. Hudson
Inventor:
Joseph Lingley
By Charles Melbourne White
Attorney

UNITED STATES PATENT OFFICE.

JOSEPH LINGLEY, OF PECKHAM, ENGLAND.

WEATHER-SCREEN FOR MOTOR-VEHICLES.

No. 890,667.

Specification of Letters Patent.

Patented June 16, 1908.

Application filed May 6, 1907. Serial No. 372,225.

*To all whom it may concern:*

Be it known that I, JOSEPH LINGLEY, a subject of the King of Great Britain, residing at 47 Harders road, Peckham, in the county of Surrey, England, coach-builder, have invented certain new and useful Improvements in or Connected with Wind or Weather Screens for Motor or other Vehicles, of which the following is a specification, reference being had to the drawings hereunto annexed, and to the figures and letters marked thereon, that is to say—

The invention relates to improvements in or connected with wind or weather screens for motor or other vehicles.

Weather screens as at present constructed are formed of two frames pivotally and concentrically connected together and each carrying a sheet of glass, there necessarily being a space or crack between the two frames or sheets of glass at the joint which admits of a considerable draft and also rain in the case of wet weather and this is the case whether the upper part of the screen is arranged either in a vertical or inclined position.

Now the objects of the present invention are to remedy these defects and also to provide means whereby perfect protection from the weather will be afforded in any position of the screen while in certain positions a clear view of the road will be left between the screens and which is of great importance in wet weather when the screens are more or less opaque.

In the accompanying drawings, Figure 1 is a side elevation of part of a motor car fitted with a screen constructed according to the present invention. Fig. 2 is a front elevation thereof. Fig. 3 is a front elevation of part of the screen separately. Fig. 4 is a side elevation thereof. Fig. 5 is a vertical section taken on the line A—A of Fig. 3. Fig. 6 is a horizontal section taken on the line B—B of Fig. 3. Fig. 7 is a side elevation of the upper end of one of the arms or links and connected parts. Fig. 8 is a vertical section taken on the line C—C of Fig. 7. Fig. 9 is a side elevation of the lower end of one of the arms or links and connected parts. Fig. 10 is a vertical section taken on the line D—D of Fig. 9. Fig. 11 is a horizontal section taken on the line E—E of Fig. 9. Fig. 12 is a side elevation of the screen showing the same in folded position. Fig. 13 is a similar view to Fig. 5 but showing the arms and upper part of the screen in a backwardly inclined position, a further position of the screen being shown by the dotted lines. Fig. 14 is a similar view but showing the arms in a vertical position and the upper part of the screen in an inclined position, a further position of the screen being shown by dotted lines. Fig. 15 is a side elevation of part of a motor car fitted with a screen the upper part of which is of modified construction. Fig. 16 is a front elevation of part of the screen separately. Fig. 17 is a vertical section taken on the line F—F of Fig. 16. Fig. 18 is a similar view to Fig. 5 illustrating a further modification in the upper part of the screen. Fig. 19 is a front elevation thereof and Fig. 20 is a side elevation taken from the side opposite to that from which Fig. 18 is viewed.

In the several figures like parts are indicated by similar reference numerals and Figs. 3 to 6, 12 to 14 and 16 to 20 are drawn to an increased scale and Figs. 7 to 11 are drawn to a further increased scale with respect to the other figures of the drawings.

Referring to Figs. 1 to 14, 1 represents the body of a motor car, 2 represents the dash board and 5 represents the usual sockets for supporting the screen and which are carried by brackets 4 from a plate or fitting 3 fixed with the dashboard 2.

The screen consists of two frames 6, 8, of wood fitted with sheets of glass 7, 9, and pivotally connected as hereinafter described so that the upper frame 8 is capable of folding and the lower frame 6 is carried by standards or bars 10 which traverse the edge of the frame 6 to which they are fastened and at their lower ends said bars 10 extend beyond the frame and are formed of round section and fit into the sockets 5 carried by the dashboard 2. The top corners and part of the edges of the upper part 8 of the frame are bound with bands 12 of metal and at about their mid-height they are by means of studs 13 pivotally mounted upon the upper ends of arms or links 24 the lower ends of which are pivotally mounted upon the frame 6 as hereinafter described. The arms or links 24 are, at their upper ends provided with offsets 25 formed with arc shaped slots 26 therein which work over set screws 14 mounted in tapped holes 15 formed in the bands 12. The inner ends of the screws 14 are headed so as to be non-detachable and are received into holes or recesses 16 provided in the frame 8 while the outer ends of said screws are provided with ears 17 by which they may be turned and with conical bosses 18 adapted to engage one or other of several corresponding enlargements or recesses 27 formed in the slots 26 so as to set the frame 8 to any desired angle with relation to the arms or links 24. The opposite or lower ends of the arms or links 24 have formed thereon or fixed thereto disks or they might be equivalent devices 28 which are by studs 29 pivotally connected to forwardly projecting offsets 11 from the standards or bars 10 or the offsets might be otherwise fixed at the top of the lower frame 6 of the screen.

The bottom edge of the upper frame 8 and its glass 9 are rounded so that they are capable of turning upon said pivots 29 while at the same time they are so proportioned that they constantly overlap the top edge of the lower part 6 of the screen.

The disks 28 are formed with arc shaped or semi-circular slots 30 having enlargements or recesses 31 therein arranged in various positions according to the angle it is desired that the upper part or frame 8 of the screen shall assume and in connection with the slots 30 are provided set screws 19 which work through the slots and are mounted in tapped holes 20 formed in the standards or bars 10 and the inner ends of said screws 19 are headed so as to be non-detachable and are received into holes or recesses 21 provided in the lower frame 6. The outer ends of the set screws 19 similarly to those marked 14 are provided with ears 22 by which they may be turned and with conical bosses 23 adapted to engage one or other of the enlargements or recesses 31 so as to set the arms or links 24 to any desired angle with relation to the lower frame or part 6. The arms or links 24 may by means of the set screws 14 of the offsets be fastened with the upper part or frame 8 of the screen in alinement with said screen and by means of the set screws 19 of the slotted ring the upper part 8 of the screen may be fastened at any desired angle with relation to the lower part 6 of the screen as shown at Fig. 13; or folded down flat upon the lower part of the screen as shown at Fig. 12 and thus fastened; or by loosening the set screws 14 of the offsets at the upper parts of the arms or links 24 and also the set screws 19 of the slotted disks at the lower parts of said arms the arms or links 24 and the upper part 8 of the screen may be set at any desired angle within certain limits with relation to each other and to the lower part 6 of the screen as shown at Fig. 14 and thus fastened.

The parts may be so set that a clear space is left between the top of the lower part of the screen 6 and the bottom of the upper part 8 thereof as shown by the full lines in Fig. 14 so as to give a clear view of the road more especially in rainy weather when the screen is more or less obscured but generally the glass of the upper part 8 of the screen overlaps the lower part 6 thereof so that weather, that is rain or the like, is effectually excluded and in certain positions such as that shown at Fig. 4, draft is also largely prevented.

In the example given at Figs. 15 to 17 the screen is formed with two movable upper parts 8 identical in every respect with the device hereinbefore described but in this case two sets of arms 24 are employed and one movable part 8 is mounted upon the other instead of upon the lower frame 6.

In the example given at Figs. 18 to 20 the device is identical with that hereinbefore described with respect to Figs. 1 to 14 except that two frames 8 are pivotally mounted upon one set of arms 24 in such manner as to overlap one another.

It will be understood that the details of construction of the device may be further varied without departing from the spirit of the invention and that the device may be applied to other vehicles than motor vehicles.

By the means hereinbefore described a simple and inexpensive screen is obtained by the aid of which weather such as rain and draft are effectually excluded and other drawbacks hereinbefore referred to are removed.

Having now particularly described and ascertained the nature of the said invention and in what manner the same is to be performed I declare that what I claim is:—

1. In a wind screen for vehicles, a fixed lower part carried by standards and an upper movable part centrally mounted upon centers permanently fixed at the upper ends of solid arms the lower ends of which are mounted upon centers permanently fixed upon the lower fixed part and means for fixing the arms at any desired angle with the lower fixed part and means for fixing the upper movable part at any desired angle with the arms substantially as herein shown and described and for the purpose stated.

2. In a wind screen for vehicles a fixed lower part carried by standards, an upper movable part overlapping the lower part and pivotally mounted at the upper ends of arms the lower ends of which are eccentrically and pivotally mounted upon forwardly projecting offsets from the lower fixed part, rearwardly projecting slotted offsets at the upper ends of the arms, set screws connected with the upper part of the screen and traversed by the slots and adapted to fix said upper part with the bars, disks formed on the lower parts of the arms concentric with the eccentric rivets and provided with concentric slots, set screws connected with the lower part of the screen and traversed by the concentric slots and adapted to fix the arms at any desired angle with relation to the lower
5 part of the screen substantially as herein shown and described and for the purpose stated.

In witness whereof I have hereunto set my hand in the presence of two witnesses.

JOSEPH LINGLEY.

Witnesses:
　C. H. WHITE,
　J. A. HUDSON.